(12) United States Patent
Adragna et al.

(10) Patent No.: US 7,440,297 B2
(45) Date of Patent: Oct. 21, 2008

(54) FAULT DETECTION FOR LOSS OF FEEBACK IN FORCED SWITCHING POWER SUPPLIES WITH POWER FACTOR CORRECTION

(75) Inventors: Claudio Adragna, Monza (IT); Mauro Fagnani, Nerviano (IT); Ugo Moriconi, Dalmine (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/523,756

(22) Filed: Sep. 18, 2006

(65) Prior Publication Data
US 2007/0063684 A1  Mar. 22, 2007

Related U.S. Application Data

(63) Continuation of application No. PCT/EP2005/050848, filed on Feb. 28, 2005.

(30) Foreign Application Priority Data
Mar. 16, 2004  (IT)  ........................... MI2004A0486

(51) Int. Cl.
*H02H 7/12* (2006.01)
*G05F 1/70* (2006.01)
*H02M 3/335* (2006.01)

(52) U.S. Cl. ........................ 363/50; 361/18; 363/56.03; 323/222

(58) Field of Classification Search ............... 363/50, 363/56.03, 56.07, 56.11, 89, 55; 323/284, 323/222, 207, 282; 361/18, 90, 92
See application file for complete search history.

(56) References Cited

U.S. PATENT DOCUMENTS

| 5,063,491 | A | * | 11/1991 | Shigeo | .................... 363/56.11 |
| 5,391,978 | A | | 2/1995 | Nath | |
| 5,796,596 | A | * | 8/1998 | Williams | .................. 363/21.16 |
| 5,859,757 | A | * | 1/1999 | Hanafusa et al. | ............ 361/100 |
| 6,160,385 | A | * | 12/2000 | Feldtkeller | .................. 323/222 |
| 6,567,252 | B2 | * | 5/2003 | Kizmann et al. | ........... 361/91.1 |
| 6,756,771 | B1 | * | 6/2004 | Ball et al. | .................... 323/222 |
| 2002/0196644 | A1 | | 12/2002 | Hwang | |

* cited by examiner

*Primary Examiner*—Jeffrey L. Sterrett
*Assistant Examiner*—Harry Behm
(74) *Attorney, Agent, or Firm*—Lisa K. Jorgenson; Robert Iannucci; Seed IP Law Group PLLC (57) ABSTRACT

A device corrects the power factor in forced switching power supplies and includes a converter and a control device to obtain a regulated voltage on an output terminal. The control device comprises an error amplifier having an inverting terminal (Vout) and a non-inverting terminal receiving a reference voltage. The device includes first and second resistances coupled in series with a conduction element positioned between the first resistance and the inverting terminal of the error amplifier and a fault detector suitable for detecting the electrical connection of the conduction element with the output terminal and suitable for detecting an output signal of the second resistance. The fault detector is suitable for supplying a malfunction signal upon detecting an electric disconnection of the conduction element from the output terminal or when the output signal of the second resistance tends to zero.

37 Claims, 4 Drawing Sheets

FAULT DETECTION FOR LOSS OF FEEBACK IN FORCED SWITCHING POWER SUPPLIES WITH POWER FACTOR CORRECTION

BACKGROUND OF THE INVENTION

1. Field of the Invention

The present invention refers to a device for the correction of the power factor in forced switching power supplies.

2. Description of the Related Art

The use of power factor correction (PFC) devices for the active correction of the power factor (PF) for forced switching power supplies is generally known when used in electronic appliances of common use such as computers, television sets, monitors, etc. and also for the supply of fluorescent lamps, that is of forced switching pre-regulator stages whose task is to absorb current from the mains supply that is almost sinusoidal and is in phase with the mains voltage. Therefore a forced switching power supply of the current type comprises a PFC and a DC-DC converter connected to the output of the PFC.

A forced switching power supply of the traditional type comprises a DC-DC converter and an input stage connected to the distribution mains supply of electrical energy constituted by a full wave diode rectifier bridge and by a capacitor connected immediately downstream so as to produce a direct non-regulated voltage starting from the sinusoidal alternating mains voltage. The capacity of the capacitor is big enough to have a relatively small ripple at its terminals in relation to a continuous level. The rectifier diodes of the bridge, thus, will only conduct for a small portion of each half-cycle of the mains voltage, since its instantaneous value is lower than the voltage on the capacitor for the majority of the cycle. The result is that the current absorbed from the mains will be constituted by a series of narrow pulses whose amplitude is 5-10 times the resulting average value.

This has considerable consequences: the current absorbed from the line has much greater peak values and effectiveness compared with the case of absorption of sinusoidal current, the mains voltage is distorted by effect of the almost simultaneous pulse absorption of all the utilities connected to the mains, in the case of three-phase systems the current in the neutral conductor is greatly increased and there is a low utilization of the energetic potentialities of the electrical energy production system. In fact, the waveform of pulse current is very rich with odd harmonics which, even not contributing to the power given to the load, contribute to increasing the effective current absorbed from the mains and thus to increasing the dissipation of energy.

In quantitative terms all this can be expressed both in power factor (PF) terms, intended as ratio between the real power (that given to the load by the power supply gives plus that dissipated internally in the form of heat) and the apparent power (the product of the effective mains voltage by the effective current absorbed), and in terms of total harmonic distortion (THD), generally intended as percentage ratio between the energy associated with all the harmonics of higher orders and that associated with the fundamental harmonic. Typically, a power supply with capacitive filter has a PF of between 0.4-0.6 and a THD exceeding 100%.

A PFC, positioned between the rectifier bridge and the input of the DC-DC converter, permits an almost sinusoidal current, in phase with the voltage, to be absorbed from the mains, making the PF near 1 and reducing the THD.

Figure 1:
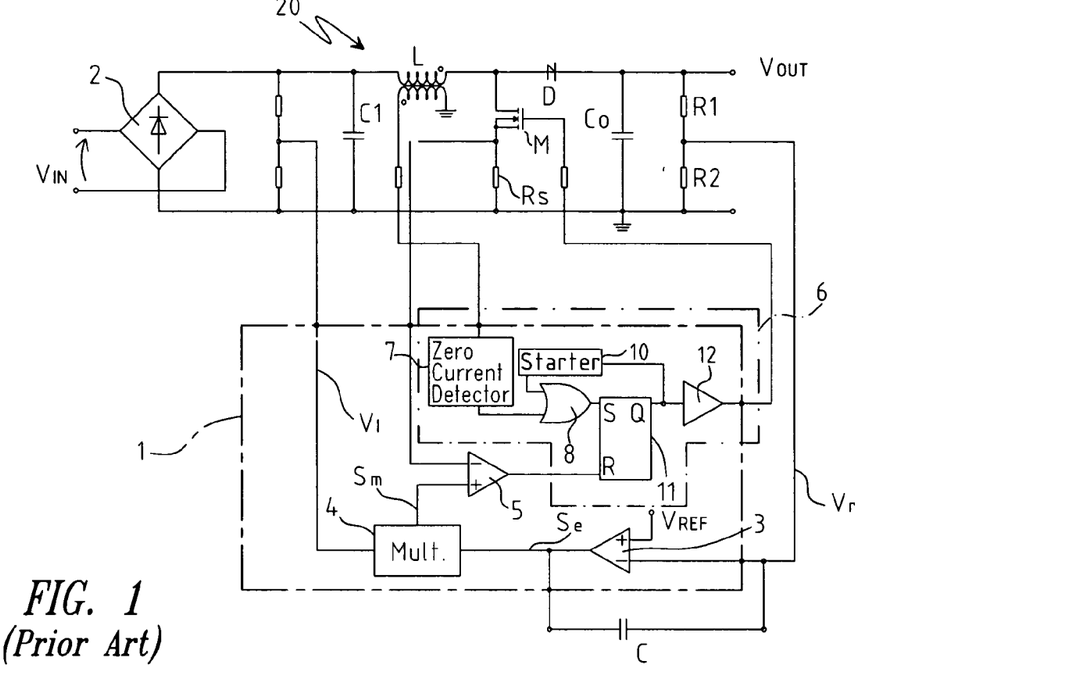
FIG. 1 is a circuit diagram of a PFC for a forced switching power supply in accordance with the known art.

FIG. 1 schematically shows a pre-regulator PFC stage comprising a boost converter 20 and a control device 1, in this case the control device L6561 produced by STMicroelectronics S.p.A. The boost converter 20 comprises a full wave diode rectifier bridge 2 having in input a mains voltage Vin, a capacitor C1 (that serves as filter for the high frequency) having a terminal connected to the diode bridge 2 and the other terminal connected to ground, an inductance L connected to a terminal of the capacitor C1, a MOS power transistor M having the drain terminal connected to a terminal of the inductance L downstream thereof and having the source terminal connected to a resistance Rs connected to ground, a diode D having the anode connected to the common terminal of the inductance L and of the transistor M and the cathode connected to a capacitor Co having the other terminal connected to ground. In output the boost converter 20 generates a direct voltage Vout on the capacitor Co exceeding the maximum peak mains voltage, typically 400 V for systems powered with European mains or with universal powering. Such voltage Vout will be the input voltage of the DC-DC converter connected to the PFC.

The control device 1 must keep the output voltage Vout at a constant value by means of a feedback control action. The control device 1 comprises an operational error amplifier 3 suitable for comparing a part of the output voltage Vout, that is the voltage Vr given by Vr=R2×Vout/(R2+R1) (where the resistances R1 and R2 are connected in series to each other and in parallel with the capacitor Co) with a reference voltage Vref, for example of the value of 2.5V, and generates an error signal proportional to their difference. The output voltage Vout presents a ripple at a frequency that is double that of the mains and overlays the continuous value. If however the band amplitude of the error amplifier is considerably reduced (typically lower than 20 Hz) by means of the use of a suitable compensation network comprising at least a capacitor and we assume almost stationary operation, that is with constant effective input voltage and output load, this ripple will be gradually attenuated and the error signal will become constant.

The error signal Se is sent to a multiplier 4 where it is multiplied by a signal Vi given by a part of the mains voltage rectified by the diode bridge 2. At the output of the multiplier 4 a signal Sm will be present and will be a rectified sinusoid whose amplitude will depend, obviously, on the effective mains voltage and on the error signal Se.

The signal Sm is sent to the non-inverting input of a comparator PWM 5 while on the inverting input there is the signal Srs present on the resistance Rs. If the signals Srs and Sm are equal the comparator 5 sends a signal to a control block 6 suitable for driving the transistor M and which, in this case, provides for turning it off. In this manner the output signal Sm of the multiplier determines the peak current of the transistor M and this will thus be enveloped by a rectified sinusoid. A filter disposed at the input of the stage eliminates the switching frequency component and ensures that the current absorbed from the mains has the form of the sinusoidal envelope. The block 6 comprises a zero current detecting block 7 capable of sending a pulse signal to an OR gate 8 whose other input is connected to a starter 10, suitable for sending a signal to the OR gate 8 immediately at the initial time; the output signal S of the OR gate 8 is the set input S of a set-reset flip-flop 11 having another input R which is the output signal of the device 5, and having an output signal Q. The signal Q is sent in input to a driver 12 that controls the turn-on or the turn-off of the transistor M.

The error amplifier 3 can be made in two manners: either as a real voltage amplifier, in which the output voltage is proportional to the difference between the voltages at its input terminals, or as a transconductance amplifier, whose output current is proportional to the difference between the voltages present at the input terminals. It is preferable to use voltage amplifiers as error amplifiers for their greater immunity to noise such as in the device L6561 mentioned.

Considering that in all closed-loop feedback control systems it is necessary to modify the transfer function of the gain of the loop so as to ensure the stability of the loop itself as well as to provide a satisfying dynamic behavior thereof, in the case of the PFCs this is normally done by modifying the frequency reply of the error amplifier. Using a voltage amplifier as error amplifier, the compensation network comprises at least a capacitance C connected in feedback between the output and the inverting input of the amplifier 3.

One of the possible breakdowns in a forced switching power supply with PFC is the breaking of the control loop of the voltage.

The most frequent cause is due to the opening of the resistance R1 of the output divider connected to the high voltage: in this case the system loses the information on the output voltage and the resistance R2 tends to carry the input of the error amplifier towards ground. In this manner the output is unbalanced upwards and therefore the turn-on of the transistor M is commanded for the maximum possible duration. It follows that the output voltage will increase without control, carrying the load fed by the PFC as well as the PFC itself to destruction.

With the error amplifier 3, the presence of the compensation network with the capacitor C positioned between the output and the inverting input limits the latter to the same potential as the other input for the whole time in which the current can flow through the capacitor C, that is until the output of the error amplifier 3 has the possibility of increasing. When the output reaches the upper end of its dynamics or, as is said, the error amplifier 3 is at high saturation, current does not pass any longer in the capacitor and the inverting input can go to zero.

Figure 2:
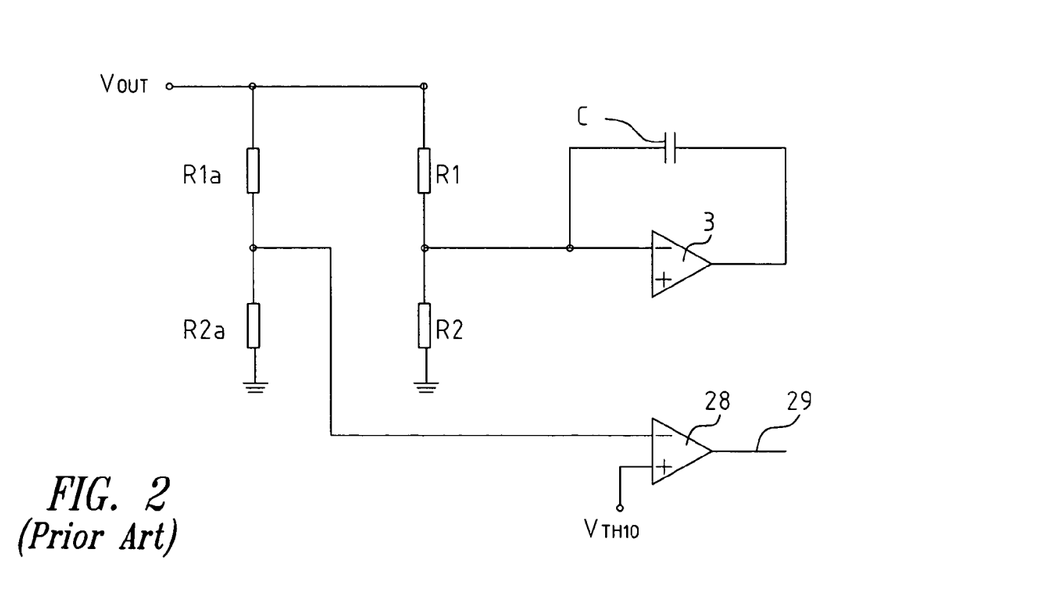
FIG. 2 shows a circuit solution of the known art for the protection of the PFC of FIG. 1 in case of voltage loop breaking.

On the market there are integrated PFCs that offer a protection against the opening of the control loop of the voltage. The solution in these PFCs consists of adding another resistive divider (constituted by the resistances R1a and R2a in series to each other) connected to the output of the PFC that permits the reading of the voltage and of using another comparator 28 that has its inverting input connected to the common terminal of the resistances R1a and R2a and the non-inverting input connected to a reference voltage Vth10, as can be seen in FIG. 2. At the moment in which the resistance R1 opens, the voltage on the inverting input of the comparator 28 exceeds the voltage Vth10 and the output 29 of the comparator 28 takes care of turning off the transistor M.

BRIEF SUMMARY OF THE INVENTION

One embodiment of the present invention is a device for the correction of the power factor in forced switching power supplies that is different from known devices.

One embodiment of the present invention is a device for the correction of the power factor in forced switching power supplies, comprising a converter and a control device coupled with said converter in order to obtain from an alternated mains input voltage a regulated voltage on the output terminal, said converter comprising a power transistor and said control device comprising an error amplifier having in input on the inverting terminal a signal proportional to said regulated voltage and on the non-inverting terminal a reference voltage, said signal proportional to said regulated voltage being produced by a first resistance and a second resistance coupled in series to which said regulated voltage is applied, a terminal of said second resistance being connected with said inverting terminal of the error amplifier, wherein the device comprises first means positioned between said first resistance and the inverting terminal of the error amplifier and second means suitable for detecting the electrical connection of said first means with the output terminal of said device for the correction of the power factor and suitable for detecting an output signal from said second resistance, said second means being suitable for supplying a malfunction signal of the device for the correction of the power factor when said second means detect the electrical disconnection of said first means from said output terminal or when the output signal of said second resistance tends to zero.

The device permits the protection of the device PFC itself if the value of the signal proportional to the output voltage and in input to the control device of the PFC tends to zero due to a breaking of the control loop.

BRIEF DESCRIPTION OF THE SEVERAL VIEWS OF THE DRAWINGS

The characteristics and the advantages of the present invention will appear evident from the following detailed description of an embodiment thereof, illustrated as non-limiting example in the enclosed drawings, in which.

DETAILED DESCRIPTION OF THE INVENTION

Figure 3:
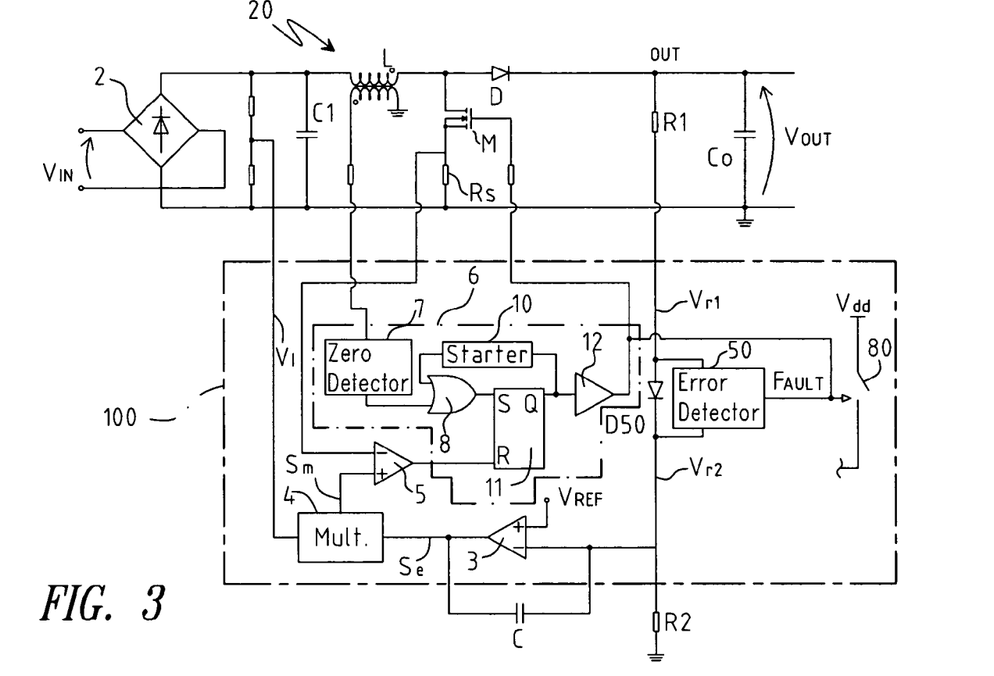
FIG. 3 is a circuit diagram of a PFC for a forced switching power supply in accordance with the present invention.

FIG. 3 shows a circuit diagram of a PFC for a forced switching power supply in accordance with a first embodiment of the present invention; the elements the same as the circuit of FIG. 1 will be indicated with the same references. The PFC comprises a converter 20 fitted with a full wave diode rectifier bridge 2 having in input a mains voltage Vin, a capacitor C1 (that serves as filter for the high frequency) having a terminal connected to the diode bridge 2 and the other terminal connected to ground, an inductance L connected to a terminal of the capacitor C1, a MOS power transistor M having the drain terminal connected to a terminal of the inductance L downstream from the latter and having the source terminal connected to a resistance Rs connected to ground, a diode D having the anode connected to the common terminal of the inductance L and of the transistor M and the cathode connected to the output terminal Out of the PFC; a capacitor Co is also present connected between the terminal Out and ground. The boost converter 20 generates in output a direct voltage Vout on the capacitor Co exceeding the maximum mains peak voltage, typically 400 V for systems powered with European mains or with universal powering. This voltage Vout will be the input voltage of the DC-DC converter connected to the PFC.

The PFC comprises a control circuit 100 suitable for keeping the output voltage Vout at a constant value by means of a feedback control action. The control circuit 100 comprises an error amplifier 3 suitable for comparing a part of the output voltage Vout, that is the voltage Vr obtained by means of the resistive divider constituted by the resistances R1 and R2, with a reference voltage Vref, for example of the value of 2.5V, and generates an error signal Se proportional to their difference. The output voltage Vout presents a ripple at a frequency that is double that of the mains and is superimposed on the continuous value. If however the band amplitude of the error amplifier is reduced considerably (typically lower than 20 Hz) by means of the use of a suitable compensation network comprising at least one capacitor and we assume almost stationary operation, that is with constant effective input voltage and output load, this ripple will be exceeded and the error signal will become constant. The error amplifier 3 is made like a voltage amplifier and is compensated by means of a compensation network comprising at least one capacitance C connected between its inverting input terminal and its output terminal.

The error signal Se is sent to a multiplier 4 where it is multiplied by a signal Vi given by a part of the mains voltage rectified by the diode bridge 2. At the output of the multiplier 4 a signal Sm will be present given by a rectified sinusoid whose amplitude will obviously depend on the effective mains voltage and on the error signal.

The signal Sm is sent to the non-inverting input of a pulse width modulation (PWM) comparator 5 while on the inverting input there is the signal Srs present on a resistance Rs added between the non-drivable terminal of the transistor MOS M and ground. If the signals Srs and Sm are equal the comparator 5 sends a reset signal R to a set-reset flip-flop 11 being part of a control block 6 to command the turn-off of the transistor M. The block 6 comprises a zero current detecting block 7 capable of sending a pulse signal to an OR gate 8 whose other input is connected to a starter 10, suitable for sending a signal to the OR gate 8 at the initial time instant; the output signal S of the OR gate 8 is the set input S of the flip-flop 11 that has an output signal Q. The signal Q is sent in input to a driver 12 that commands the turn-on and turn-off of the transistor M. In this manner the output signal Sm of the multiplier determines the peak current of the transistor M and this will then be enveloped by a rectified sinusoid. A filter positioned at the input of the stage eliminates the switching frequency component and ensures that the current absorbed from the mains has the shape of the sinusoidal envelope.

The control circuit 100 also comprises a diode D50 having the anode connected to the resistance R1 and the cathode connected to the inverting terminal of the error amplifier 3 connected to a terminal of the resistance R2; the control circuit 100 also comprises a circuit block 50 suitable for detecting the electrical connection of the diode D50 with the output terminal Out of said device for the correction of the power factor and suitable for detecting a signal in output Vr2 from the second resistance R2. Said circuit block 50 is suitable for supplying a malfunction signal Fault of the device for the correction of the power factor when it detects the electric disconnection of the D50 from said output terminal Out or when the output signal Vr2 of the second resistance R2 tends to zero.

Said circuit block 50 is suitable for commanding the turn-off of the power transistor M and the deactivation of said control circuit 100 by means of emission of the signal Fault; in fact the signal Fault commands the turn-off of the transistor M and permits the disconnection of the supply Vdd of the control circuit 100 by acting on a switch 80, positioned between the supply voltage Vdd and the circuits being part of the control device 100, causing the PFC to turn-off.

Figure 4:
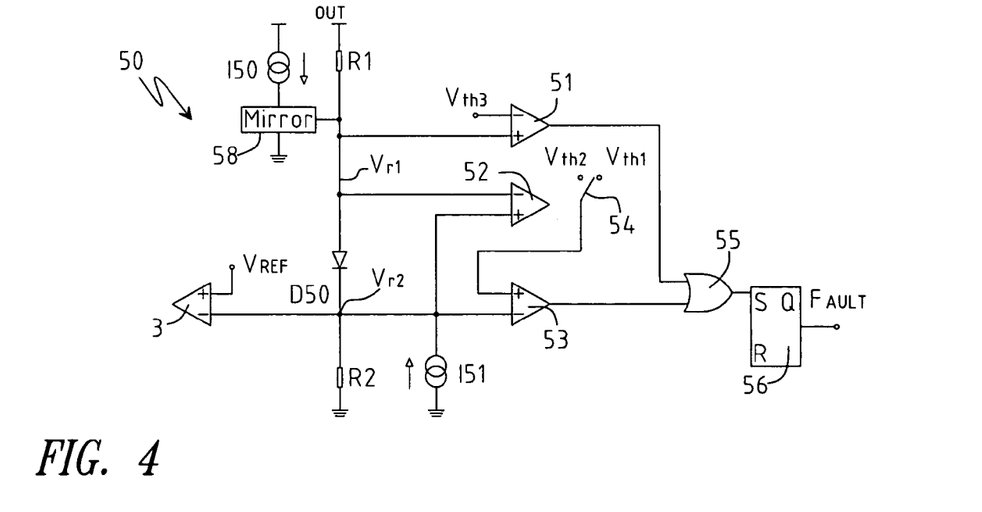
FIG. 4 is a circuit diagram of the diode D50 and of the circuit block 50 of the PFC of FIG. 3 in accordance with the first embodiment of the present invention.

FIG. 4 shows a first embodiment of the diode D50 and of the circuit block 50. The latter comprises a first comparator 52 having the inverting terminal connected to the anode of the diode D50 and the non-inverting terminal, on which the signal Vr2 is present, connected to the cathode of the diode D50 and a second comparator 53 having the inverting terminal, on which the signal Vr2 is present, connected to the cathode of the diode D50 and the non-inverting terminal connectable to a reference voltage Vth2 or to the reference voltage Vth1 by means of a switch 54 driven by the output of the comparator 52. The output of the comparator 53 represents the set signal of a set-reset flip-flop 56; the latter generates in output the signal Fault for the deactivation of the control circuit 100 and the turn-off of the transistor M. A current generator I50 which generates a current of a smaller value than the current that flows through the diode D50 and that is of approximately 1 µA is coupled to the anode of the diode D50, for example by means of a current mirror 58; the current generator I50 is coupled to ground and the current I50 is such that it leaves the anode of the diode D50. Another current generator I51 is coupled to the cathode of the diode D50, again of approximately 1 µA.

Normally, that is in regular operating conditions, the voltage on the inverting terminal of the operational amplifier 3, that is the signal Vr2, is equal to Vref while that on the anode of the diode D50, that is the signal Vr1, is equal to Vref+Vd50 where Vd50 is the voltage drop on the diode D50. The output of the comparator 52 is low and the switch 54 is driven so as to be connected to the voltage Vth1 that is lower than Vref; in this manner the output of the comparator 53 is low.

If the resistance R1 opens, the voltage Vr1 on the anode of the diode D50 will tend to zero thanks to the current I50; this will cause an inversion of the voltage drop at the terminals of the diode D50 that will cause the comparator 52 to change state. The latter drives the switch 54 to connect itself to the voltage Vth2 that exceeds Vref; the comparator 53 changes state and sends in output the set signal to the flip-flop 56 and the latter generates the signal Fault.

If the resistance R2 goes in short circuit the signal Vr2 tends to zero, the comparator 53 changes state and activates the flip-flop 56 that sends the signal Fault.

Preferably the circuit block 50 comprises a third comparator 51 having the inverting input terminal connected to the anode of the diode D50 and the non-inverting terminal connected to a reference voltage Vth3. The circuit block 50 also comprises an OR gate 55 that has in input the outputs of the comparators 51 and 53 and whose output is the set signal of the flip-flop 56. The comparator 51 protects the control device 100 from the opening of the connections of the diode D50 or the breaking of the same diode D50; in fact, in this case, the voltage Vr1 on the non-inverting terminal of the comparator 51 tends to rise and when it exceeds the voltage Vth3, that is greater than the voltage Vth2, it will cause the change of state of the comparator 51 which, through the OR gate 55, will activate the flip-flop 56 which in turn will cause the signal Fault for the turn-off of the PFC.

Figure 5:
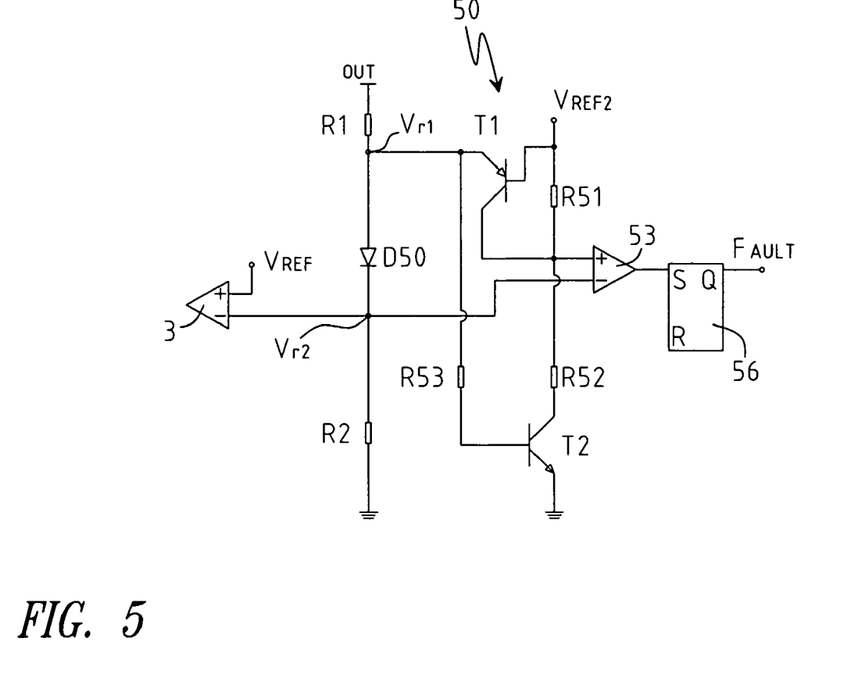
FIG. 5 is a circuit diagram related to an implementation of the circuit of FIG. 4.

In FIG. 5 the diode D50 and the circuit block 50 in accordance with a variant to the first embodiment of the invention are shown. In said variant the function previously carried out by the comparator 52 is carried out by the transistor T2. The bipolar pnp transistor T2 has the base terminal coupled to the anode of the diode D50 by means of a resistance R53, the emitter terminal connected to ground and the collector terminal coupled to a reference voltage Vref2 by means of the series of two resistances R51 and R52. The comparator 53 has the inverting terminal connected to the cathode of the diode D50 and the non-inverting terminal connected to the common terminal of the resistances R51 and R52. The output of the comparator 53 is the set signal of the flip-flop 56 suitable for generating the signal Fault. The voltage Vref2 is set lower than the voltage given by the voltage Vref and by the voltage drop Vd50 on the diode D50, Vref2<Vref+Vd50, and greater than the voltage Vref, Vref2>Vref.

In normal functioning conditions of the PFC the transistor T2 is on considering that on the base terminal the voltage Vr1 is present given by Vref+Vd50 where Vd50 is the voltage drop at the terminals of the diode D50. The voltage present on the non-inverting terminal of the comparator 53 is lower than Vref (is given by Vref2×R52/(R51+R52) where the resistances are set to obtain a voltage lower than Vref so that the output of the comparator is low.

If the resistance R1 opens, the terminal constituted by the anode of the diode D50 remains insulated and the transistor T2 turns off since the base is no longer powered. The voltage on the non-inverting terminal of the comparator 53 is Vref2 that permits the change of state of the comparator 53 itself; said change of state of the comparator 53 permits the generation of the signal Fault by sending the set signal to the flip-flop 56.

If the resistance R2 goes into short circuit the signal Vr2 tends to zero, the comparator 53 changes state and activates the flip-flop 56 that sends the signal Fault.

Still in the circuit block 50 of FIG. 5 the function carried out by the comparator 51 is carried out by the transistor T1. The pnp transistor T1 has the base terminal connected to the voltage Vref2, the collector terminal connected to the non-inverting input of the comparator 53 and the emitter terminal connected to the anode of the diode D50.

During normal functioning of the PFC the transistor T1 remains off. If the diode D50 opens or its connections with the terminals of the resistances R1 and R2 opens, or the resistance R2 opens, the voltage Vr1 on the terminal constituted by the anode of the diode D50 is carried upwards turning on the transistor T1; this causes an increase of the value of the voltage on the non-inverting input of the comparator 53 which, becoming greater than Vref, permits a change of state of the comparator itself and the consequent generation of the signal Fault by activation of the flip-flop 56.

Figure 6:
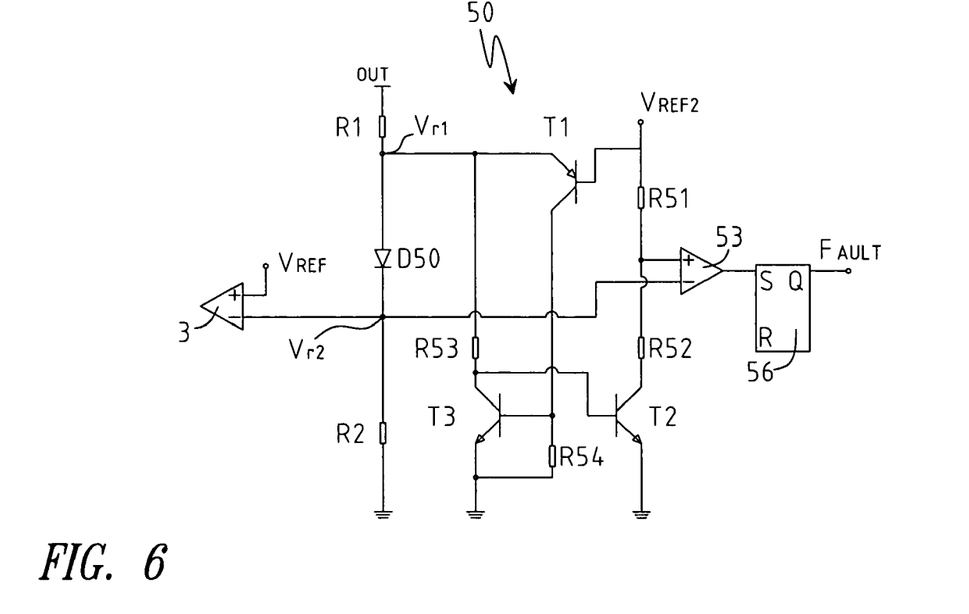
FIG. 6 is a circuit diagram related to a further implementation of the circuit of FIG. 4.

In FIG. 6 the diode D50 and the circuit block 50 in accordance with another variant of the first embodiment of the invention are shown. Said variant differentiates from the variant of FIG. 5 only by the introduction of a further bipolar npn transistor T3 having the emitter terminal connected to ground, the collector terminal connected to the base terminal of the transistor T2 and the base terminal coupled to the collector terminal of the transistor T1 by means of the resistance R54; the collector terminal of the transistor T1 is no longer connected to the non-inverting input terminal of the comparator 53. During normal functioning of the PFC the transistors T1 and T3 are off. If the diode D50 opens, or its connections with the terminals of the resistances R1 and R2 opens, or the resistance R2 opens, the voltage on the terminal constituted by the anode of the diode D50 is carried upwards turning on the transistor T1; this causes the turn-on of the transistor T3 that provides for the transistor T2 to be turned off. Therefore there is an increase of the value of the voltage on the non-inverting input of the comparator 53 to Vref2 that permits a change of state of the comparator itself and the consequent generation of the signal Fault by activation of the flip-flop 56.

Figure 7:
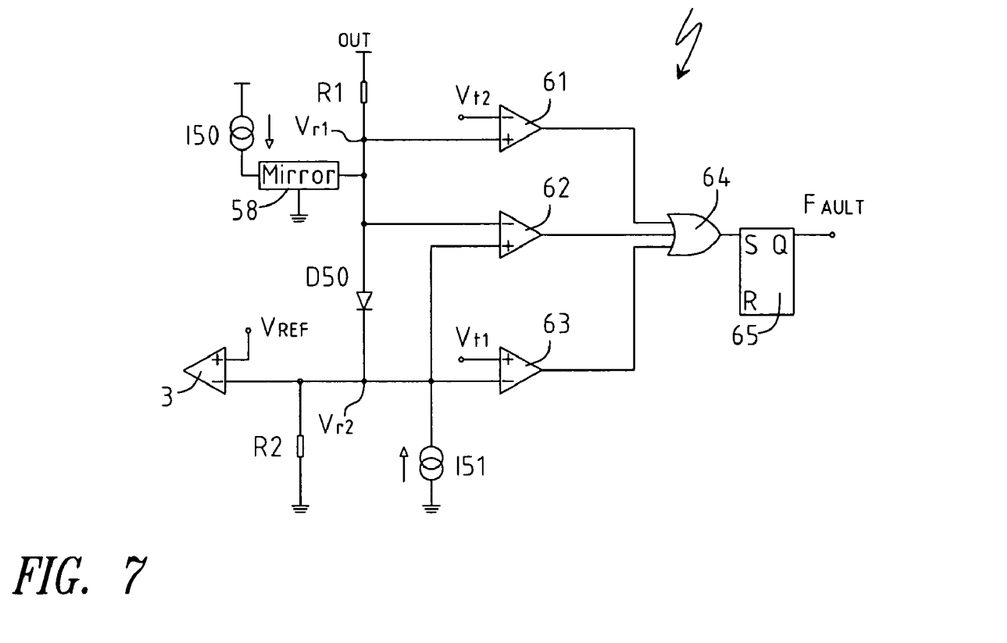
FIG. 7 is a circuit diagram of the diode D50 and of the circuit block 50 of the PFC of FIG. 3 in accordance with the second embodiment of the present invention.

In FIG. 7 a second embodiment of circuit comprising the diode D50 and the circuit block 50 is shown. The latter comprises a first comparator 62 having the inverting terminal, on which the voltage Vr1 is present, connected to the anode of the diode D50 and the non-inverting terminal, on which the signal Vr2 is present, connected to the cathode of the diode D50 and a second comparator 63 having the inverting terminal, on which the signal Vr2 is present, connected to the cathode of the diode D50 and the non-inverting terminal connected to a reference voltage Vt1 lower than Vref. The outputs of the comparators 62 and 63 are in input to an OR gate 64 whose output signal represents the set signal of a set-reset flip-flop 65; the latter generates in output the signal Fault for the deactivation of the control circuit 100 and for the turn-off of the transistor M. A current generator I50, which generates a current of a smaller value than the current that flows through the diode D50 and that is of approximately 1 μA, is coupled to the anode of the diode D50, for example by means of a current mirror 58; the current generator I50 is coupled to ground and the current I50 is such that it leaves the anode of the diode D50. Another current generator I51 again of approximately 1 μA is connected to the cathode.

Normally, that is in regular operating conditions, the voltage on the inverting terminal of the operational amplifier 3 is equal to Vref while that on the anode of the diode D50 is equal to Vref+Vd50 where Vd50 is the voltage drop on the diode D50. The outputs of the comparators 62 and 63 are low.

If the resistance R1 opens, the voltage Vr1 on the anode of the diode D50 will tend to zero thanks to the current I50; this will cause an inversion of the voltage drop at the terminals of the diode D50 that will make the comparator 62 to change state. The latter activates the OR gate 64 that outputs the set signal to the flip-flop 56 and the latter generates the signal Fault.

If the resistance R2 goes into short circuit the signal Vr2 tends to zero, the comparator 63 changes state and activates, through the OR gate 64, the flip-flop 65 that sends the signal Fault.

Preferably the circuit block 50 comprises a third comparator 61 having the inverting input terminal connected to the anode of the diode D50, the non-inverting terminal connected to a reference voltage Vt2 and the output in input to the OR gate 64. The comparator 61 protects the control device 100 from the opening of the connections of the diode D50 or the breaking of the same diode D50; in fact, in this case, the voltage on the non-inverting terminal of the comparator 61 tends to rise and when it exceeds the voltage Vt2, that is greater than Vref+Vd50, it will cause the change of state of the comparator 61 which, through the OR gate 64, will activate the flip-flop 65 which in turn will produce the signal Fault for the turn-off of the PFC.

Figure 8:
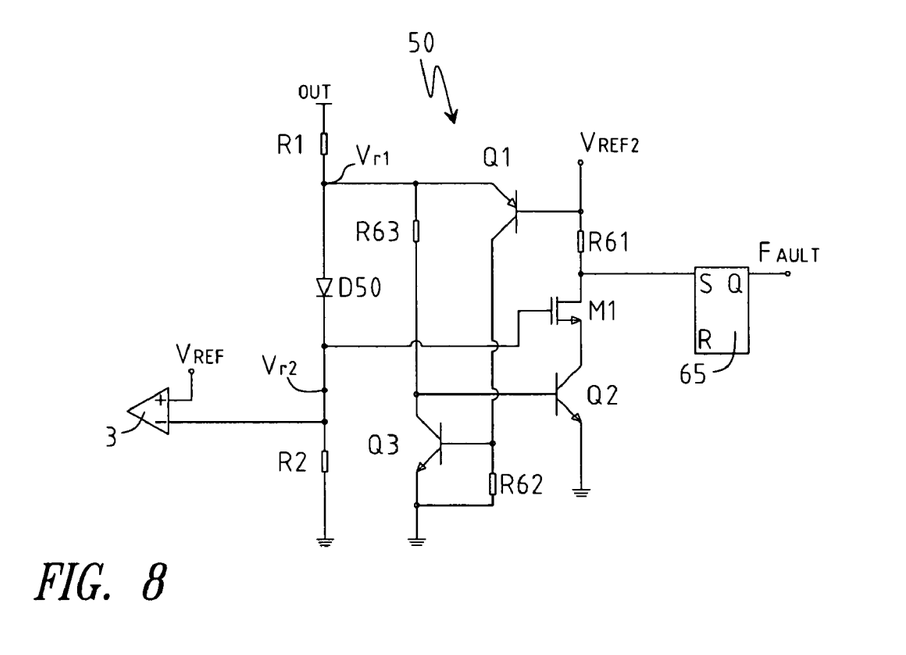
FIG. 8 is a circuit diagram related to an implementation of the circuit of FIG. 7.

In FIG. 8 the diode D50 and the circuit block 50 in accordance with a variant to the second embodiment of the invention are shown. In said variant the function carried out by the comparator 62 is carried out by the transistors M1 and Q2. The bipolar npn transistor Q2 has the base terminal coupled to the anode of the diode D50 by means of a resistance R63, the emitter terminal connected to ground and the collector terminal coupled to the source terminal of the transistor MOS M1. The latter has the gate terminal connected to the cathode of the diode D50 and the drain terminal coupled to the reference voltage Vref2, whose value is lower than Vref+Vd50 but is greater than Vref, by means of a resistance R61. The drain terminal is connected with the set input of the flip-flop 65 suitable for generating the signal Fault.

In normal functioning conditions of the PFC the transistor Q2 is on since on the base terminal there is the voltage Vr1 given by Vref+Vd50 where Vd50 is the voltage drop at the terminals of the diode D50 and also the transistor M1 is on. The voltage present on the drain terminal of the transistor M1 is near zero so that the flip-flop 65 does not generate the signal Fault.

If the resistance R1 opens, the terminal constituted by the anode of the diode D50 remains insulated and the transistor Q2 turns off since the base is no longer powered and the voltage on the source terminal of the transistor M1 tends to rise and to turn off transistor M1 itself. The voltage on the drain terminal of the transistor M1 is Vref2 that permits the generation of the signal Fault by sending the set signal to the flip-flop 65.

If the resistance R2 goes into short circuit the transistor M1 turns off and the voltage on the drain terminal becomes Vref2 that activates the flip-flop 56 for the generation of the signal Fault.

Still in the circuit block 50 of FIG. 8 the function carried out by the comparator 61 is carried out by the transistors Q1 and Q3. The pnp transistor Q1 has the base terminal connected to the voltage Vref2, the emitter terminal connected to the anode of the diode D50 and the collector terminal connected to the base terminal of the transistor Q3. The latter has the emitter terminal connected to ground and the collector terminal connected to the base terminal of the transistor Q2; a resistance R62 is positioned between the base and emitter terminals of the transistor Q3.

If the diode D50 opens, or its connections with the terminals of the resistances R1 and R2 opens, or the resistance R2 opens, the voltage on the terminal constituted by the anode of the diode D50 is carried upwards turning on the transistor Q1; this causes the turn-on of the transistor Q3 that then turns off the transistor Q2. Therefore there is an increase of the value of the voltage on the source terminal of the transistor M1 that tends to turn off the transistor M1 itself. The voltage on the drain terminal of the transistor M1 is Vref2 that permits the generation of the signal Fault by activation of the flip-flop 65.

In both solutions the optional current generator I51 is shown. Its purpose is to eliminate the static error caused by the generator I50, whose value typically is not precise and whose statistic variation worsens the precision of the output voltage. From the current balance on the terminal constituted by the anode and by the cathode of the diode D50 we have:

$$I(R1) = \frac{Vout - (Vref + Vd50)}{R1} = I(D50) + I50 = I(R2) + I50 = \frac{Vref}{R2} + I50$$

where I(R1) is the current that flows through the resistance R1, I(R2) is the current that flows through the resistance R2 and I(D50) is the current that flows through the diode D50.

Resolving in relation to Vout we obtain:

$$Vout = Vref\left(1 + \frac{R1}{R2}\right) + I50 \times R1 + Vd50$$

While the voltage Vd50 is definitely negligible in relation to the voltage Vout (less than 0.2%), so that all the more so its statistic and temperature variations are also, the term I50×R1, by effect of the statistic and temperature variation, could even exceed 1%, thereby considerably influencing the precision of the voltage Vout (the tolerance of the voltage Vref is typically around 2-3%).

With the addition of the generator I2 we have:

$$I(D50)=I(R1)-I50; I(R2)=I(D50)+I51=I(R1)-I50+I51$$

and, choosing I50=I51, we obtain I(R2)=I(R1) and thus:

$$\frac{Vout - (Vref + Vd50)}{R1} = \frac{Vref}{R2} \Rightarrow Vout = Vref\left(1 + \frac{R1}{R2}\right) + Vd50$$

To be exact, a residual error remains due to the fact that the currents I50 and I51 are not exactly equal, however this error is at least of a lower order.

In all the circuit structures present in the FIGS. 3-8 the circuit components indicated as being part of the control circuit 100 are integrated in the same chip.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for correcting a power factor in a forced switching power supply, comprising:
    an output terminal;
    a converter that provides a regulated voltage on the output terminal, the converter including a power transistor having a control terminal;
    a control device coupled with the converter to obtain the regulated voltage, the control device including an error amplifier having a first input and a second input that receives a first reference signal;
    a first resistance coupled between the output terminal and the first input of the error amplifier;
    a second resistance coupled between a reference voltage and the first input of the error amplifier;
    an error detector having a first input coupled to first input of the error amplifier and an output coupled to the control terminal of the power transistor, the error detector being structured to turn off the power transistor in response to detecting that a voltage at the first input of the error amplifier is below a first threshold voltage; and
    a conduction element coupled between the first resistance and the first input of the error amplifier, wherein the error detector includes a second input coupled to an intermediate node between the first resistance and the conduction element, the error detector being structured to turn off the power transistor in response to detecting that a voltage at the intermediate node is less than the voltage at the first input of the error amplifier.

2. The device of claim 1, wherein the conduction element includes a diode having an anode connected with the first resistance and a cathode connected with the second resistance.

3. The device of claim 1, wherein the error detector includes:
    a first comparator having a first input coupled to the first threshold voltage, a second input coupled to the first input of the error amplifier; and an output coupled to the control terminal of the power transistor.

4. The device of claim 3, wherein the error detector includes:
- a second comparator having a first input coupled to the intermediate node, a second input coupled to the first input of the error amplifier, and an output;
- a switch having a control terminal coupled to the output of the second comparator, a first input coupled to the first threshold voltage, a second input coupled to a second threshold voltage, and an output coupled to the first input of the first comparator.

5. The device of claim 3, wherein the error detector includes:
- a logic gate having a first input coupled to the output of the first comparator, a second input, and an output coupled to the control terminal of the power transistor;
- a second comparator having a first input coupled to a second threshold voltage, a second input coupled to the intermediate node, and an output coupled to the second input of the logic gate.

6. The device of claim 3, wherein the error detector includes a flip-flop coupled between the output of the first comparator and the control terminal of the power transistor.

7. The device of claim 3, wherein the error detector includes:
- a first transistor having a control terminal coupled to a second reference signal, a first conduction terminal coupled to the intermediate node, and a second conduction terminal coupled to the first input of the first comparator; and
- a second transistor having a control terminal coupled to the intermediate node, a first conduction terminal coupled to the first input of the first comparator; and a second conduction terminal coupled to the reference voltage.

8. The device of claim 3, wherein the error detector includes:
- a first transistor having a control terminal coupled to a second reference signal, a first conduction terminal coupled to the intermediate node, and a second conduction terminal;
- a second transistor having a control terminal coupled to the intermediate node, a first conduction terminal coupled to the first input of the first comparator; and a second conduction terminal coupled to the reference voltage; and
- a third transistor having a control terminal coupled to the second conduction terminal of the first transistor, a first conduction terminal coupled to the intermediate node, and a second conduction terminal coupled to the ground voltage.

9. The device of claim 3, wherein the error detector includes:
- a second comparator having a first input coupled to the intermediate node, a second input coupled to the first input of the error amplifier, and an output;
- a logic gate having a first input coupled to the output of the first comparator, a second input coupled to the output of the second comparator, and an output coupled to the control terminal of the power transistor; and
- a current generator coupled between the intermediate node and a reference voltage.

10. The device of claim 1, wherein the error detector includes:
- a first transistor having a control terminal coupled to the first input of the error amplifier, a first conduction terminal coupled to the control terminal of the power transistor, and a second conduction terminal;
- a second transistor having a control terminal coupled to a second reference signal, a first conduction terminal coupled to the intermediate node, and a second conduction terminal;
- a third transistor having a control terminal coupled to the intermediate node, a first conduction terminal coupled to the second conduction terminal of the first transistor, and a second conduction terminal coupled to the reference voltage; and
- a fourth transistor having a control terminal coupled to the second conduction terminal of the second transistor, a first conduction terminal coupled to the intermediate node, and a second conduction terminal coupled to the control terminal of the fourth transistor and to the reference voltage.

11. A device for correcting a power factor in a forced switching power supply, comprising:
- an output terminal;
- a converter that provides a regulated voltage on the output terminal, the converter including a power transistor having a control terminal;
- a control device coupled with the converter to obtain the regulated voltage, the control device including an error amplifier having a first input and a second input that receives a first reference signal;
- a first resistance coupled between the output terminal and the first input of the error amplifier;
- a second resistance coupled between a reference voltage and the first input of the error amplifier;
- a conduction element coupled to the first resistance at first intermediate node and coupled to the second resistance and the first input of the error amplifier at a second intermediate node; and
- an error detector having a first input coupled to the first intermediate node, a second input coupled to the second intermediate node, and an output coupled to the control terminal of the power transistor, the error detector being structured to turn off the power transistor in response to detecting a drop in voltage at one of the intermediate nodes, wherein the conduction element includes a diode having an anode connected with the first resistance and a cathode connected with the second resistance.

12. A device for correcting a power factor in a forced switching power supply, comprising:
- an output terminal;
- a converter that provides a regulated voltage on the output terminal, the converter including a power transistor having a control terminal;
- a control device coupled with the converter to obtain the regulated voltage, the control device including an error amplifier having a first input and a second input that receives a first reference signal;
- a first resistance coupled between the output terminal and the first input of the error amplifier;
- a second resistance coupled between a reference voltage and the first input of the error amplifier;
- a conduction element coupled to the first resistance at first intermediate node and coupled to the second resistance and the first input of the error amplifier at a second intermediate node; and
- an error detector having a first input coupled to the first intermediate node, a second input coupled to the second intermediate node, and an output coupled to the control terminal of the power transistor, the error detector being structured to turn off the power transistor in response to detecting a drop in voltage at one of the intermediate nodes, wherein the error detector includes:

a first comparator having a first input coupled to a first threshold voltage, a second input coupled to the second intermediate node; and an output coupled to the control terminal of the power transistor.

13. The device of claim 12, wherein the error detector includes:
a second comparator having a first input coupled to the first intermediate node, a second input coupled to the second intermediate node, and an output;
a switch having a control terminal coupled to the output of the second comparator, a first input coupled to the first threshold voltage, a second input coupled to a second threshold voltage, and an output coupled to the first input of the first comparator.

14. The device of claim 12, wherein the error detector includes:
a logic gate having a first input coupled to the output of the first comparator, a second input, and an output coupled to the control terminal of the power transistor;
a second comparator having a first input coupled to a second threshold voltage, a second input coupled to the first intermediate node, and an output coupled to the second input of the logic gate.

15. The device of claim 12, wherein the error detector includes a flip-flop coupled between the output of the first comparator and the control terminal of the power transistor.

16. The device of claim 12, wherein the error detector includes:
a first transistor having a control terminal coupled to a second reference signal, a first conduction terminal coupled to the first intermediate node, and a second conduction terminal coupled to the first input of the first comparator; and
a second transistor having a control terminal coupled to the first intermediate node, a first conduction terminal coupled to the first input of the first comparator; and a second conduction terminal coupled to the reference voltage.

17. The device of claim 12, wherein the error detector includes:
a first transistor having a control terminal coupled to a second reference signal, a first conduction terminal coupled to the first intermediate node, and a second conduction terminal;
a second transistor having a control terminal coupled to the first intermediate node, a first conduction terminal coupled to the first input of the first comparator; and a second conduction terminal coupled to the reference voltage; and
a third transistor having a control terminal coupled to the second conduction terminal of the first transistor, a first conduction terminal coupled to the first intermediate node, and a second conduction terminal coupled to the reference voltage.

18. The device of claim 12, wherein the error detector includes:
a second comparator having a first input coupled to the first intermediate node, a second input coupled to the second intermediate node, and an output;
a logic gate having a first input coupled to the output of the first comparator, a second input coupled to the output of the second comparator, and an output coupled to the control terminal of the power transistor; and
a current generator coupled between the first intermediate node and the reference voltage.

19. A device for correcting a power factor in a forced switching power supply, comprising:

an output terminal;
a converter that provides a regulated voltage on the output terminal, the converter including a power transistor having a control terminal;
a control device coupled with the converter to obtain the regulated voltage, the control device including an error amplifier having a first input and a second input that receives a first reference signal;
a first resistance coupled between the output terminal and the first input of the error amplifier;
a second resistance coupled between a reference voltage and the first input of the error amplifier;
a conduction element coupled to the first resistance at first intermediate node and coupled to the second resistance and the first input of the error amplifier at a second intermediate node; and
an error detector having a first input coupled to the first intermediate node, a second input coupled to the second intermediate node, and an output coupled to the control terminal of the power transistor, the error detector being structured to turn off the power transistor in response to detecting a drop in voltage at one of the intermediate nodes, wherein the error detector includes:
a first transistor having a control terminal coupled to the second intermediate node, a first conduction terminal coupled to the control terminal of the power transistor, and a second conduction terminal;
a second transistor having a control terminal coupled to a second reference signal, a first conduction terminal coupled to the first intermediate node, and a second conduction terminal;
a third transistor having a control terminal coupled to the first intermediate node, a first conduction terminal coupled to the second conduction terminal of the first transistor, and a second conduction terminal coupled to the reference voltage; and
a fourth transistor having a control terminal coupled to the second conduction terminal of the second transistor, a first conduction terminal coupled to the first intermediate node, and a second conduction terminal coupled to the control terminal of the fourth transistor and to the reference voltage.

20. The device of claim 11, wherein the error detector includes:
a first comparator having a first input coupled to a first threshold voltage, a second input coupled to the second intermediate node; and an output coupled to the control terminal of the power transistor.

21. The device of claim 20, wherein the error detector includes:
a second comparator having a first input coupled to the first intermediate node, a second input coupled to the second intermediate node, and an output;
a switch having a control terminal coupled to the output of the second comparator, a first input coupled to the first threshold voltage, a second input coupled to a second threshold voltage, and an output coupled to the first input of the first comparator.

22. The device of claim 20, wherein the error detector includes:
a logic gate having a first input coupled to the output of the first comparator, a second input, and an output coupled to the control terminal of the power transistor;
a second comparator having a first input coupled to a second threshold voltage, a second input coupled to the first intermediate node, and an output coupled to the second input of the logic gate.

23. The device of claim 20, wherein the error detector includes a flip-flop coupled between the output of the first comparator and the control terminal of the power transistor.

24. The device of claim 20, wherein the error detector includes:
a first transistor having a control terminal coupled to a second reference signal, a first conduction terminal coupled to the first intermediate node, and a second conduction terminal coupled to the first input of the first comparator; and
a second transistor having a control terminal coupled to the first intermediate node, a first conduction terminal coupled to the first input of the first comparator; and a second conduction terminal coupled to the reference voltage.

25. The device of claim 20, wherein the error detector includes:
a first transistor having a control terminal coupled to a second reference signal, a first conduction terminal coupled to the first intermediate node, and a second conduction terminal;
a second transistor having a control terminal coupled to the first intermediate node, a first conduction terminal coupled to the first input of the first comparator; and a second conduction terminal coupled to the reference voltage; and
a third transistor having a control terminal coupled to the second conduction terminal of the first transistor, a first conduction terminal coupled to the first intermediate node, and a second conduction terminal coupled to the reference voltage.

26. The device of claim 20, wherein the error detector includes:
a second comparator having a first input coupled to the first intermediate node, a second input coupled to the second intermediate node, and an output;
a logic gate having a first input coupled to the output of the first comparator, a second input coupled to the output of the second comparator, and an output coupled to the control terminal of the power transistor; and
a current generator coupled between the first intermediate node and the reference voltage.

27. A forced switching power supply, comprising:
a rectifier having an input and an output, the input being configured to receive an alternating input voltage; and
a correction circuit structured to correct a power factor in the forced switching power supply, the correction circuit including:
an output terminal;
a converter coupled to the output of the rectifier and configured to provide a regulated voltage on the output terminal, the converter including a power transistor having a control terminal;
a control device coupled with the converter to obtain the regulated voltage, the control device including an error amplifier having a first input and a second input that receives a first reference signal;
a first resistance coupled between the output terminal and the first input of the error amplifier;
a second resistance coupled between a reference voltage and the first input of the error amplifier;
an error detector having a first input coupled to first input of the error amplifier and an output coupled to the control terminal of the power transistor, the error detector being structured to turn off the power transistor in response to detecting that a voltage at the first input of the error amplifier is below a first threshold voltage; and a conduction element coupled between the first resistance and the first input of the error amplifier, wherein the error detector includes a second input coupled to an intermediate node between the first resistance and the conduction element, the error detector being structured to turn off the power transistor in response to detecting that a voltage at the intermediate node is less than the voltage at the first input of the error amplifier.

28. The power supply of claim 27, wherein the conduction element includes a diode having an anode connected with the first resistance and a cathode connected with the second resistance.

29. The power supply of claim 27, wherein the error detector includes:
a first comparator having a first input coupled to the first threshold voltage, a second input coupled to the first input of the error amplifier; and an output coupled to the control terminal of the power transistor.

30. The power supply of claim 29, wherein the error detector includes:
a second comparator having a first input coupled to the intermediate node, a second input coupled to the first input of the error amplifier, and an output;
a switch having a control terminal coupled to the output of the second comparator, a first input coupled to the first threshold voltage, a second input coupled to a second threshold voltage, and an output coupled to the first input of the first comparator.

31. The power supply of claim 29, wherein the error detector includes:
a logic gate having a first input coupled to the output of the first comparator, a second input, and an output coupled to the control terminal of the power transistor;
a second comparator having a first input coupled to a second threshold voltage, a second input coupled to the intermediate node, and an output coupled to the second input of the logic gate.

32. The power supply of claim 29, wherein the error detector includes a flip-flop coupled between the output of the first comparator and the control terminal of the power transistor.

33. The power supply of claim 29, wherein the error detector includes:
a first transistor having a control terminal coupled to a second reference signal, a first conduction terminal coupled to the intermediate node, and a second conduction terminal coupled to the first input of the first comparator; and
a second transistor having a control terminal coupled to the intermediate node, a first conduction terminal coupled to the first input of the first comparator; and a second conduction terminal coupled to the reference voltage.

34. The power supply of claim 29, wherein the error detector includes:
a first transistor having a control terminal coupled to a second reference signal, a first conduction terminal coupled to the intermediate node, and a second conduction terminal;
a second transistor having a control terminal coupled to the intermediate node, a first conduction terminal coupled to the first input of the first comparator; and a second conduction terminal coupled to the reference voltage; and
a third transistor having a control terminal coupled to the second conduction terminal of the first transistor, a first conduction terminal coupled to the intermediate node, and a second conduction terminal coupled to the ground voltage.

35. The power supply of claim 29, wherein the error detector includes:
   a second comparator having a first input coupled to the intermediate node, a second input coupled to the first input of the error amplifier, and an output;
   a logic gate having a first input coupled to the output of the first comparator, a second input coupled to the output of the second comparator, and an output coupled to the control terminal of the power transistor; and
   a current generator coupled between the intermediate node and a reference voltage.

36. The power supply of claim 27, wherein the error detector includes:
   a first transistor having a control terminal coupled to the first input of the error amplifier, a first conduction terminal coupled to the control terminal of the power transistor, and a second conduction terminal;
   a second transistor having a control terminal coupled to a second reference signal, a first conduction terminal coupled to the intermediate node, and a second conduction terminal;
   a third transistor having a control terminal coupled to the intermediate node, a first conduction terminal coupled to the second conduction terminal of the first transistor, and a second conduction terminal coupled to the reference voltage; and
   a fourth transistor having a control terminal coupled to the second conduction terminal of the second transistor, a first conduction terminal coupled to the intermediate node, and a second conduction terminal coupled to the control terminal of the fourth transistor and to the reference voltage.

37. The device of claim 19, wherein the conduction element includes a diode having an anode connected with the first resistance and a cathode connected with the second resistance.

* * * * *